Dec. 9, 1969 T. C. BRAUCHT 3,483,353
WELDING APPARATUS
Filed Nov. 2, 1967 2 Sheets-Sheet 1
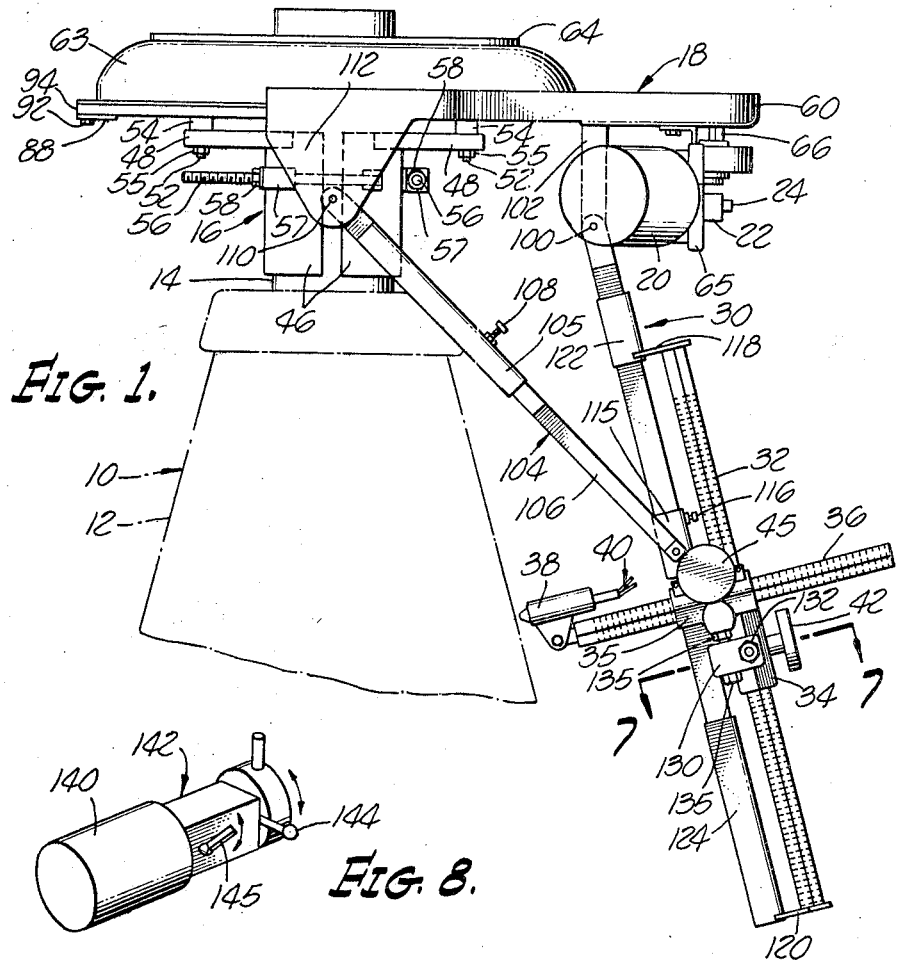
FIG. 1.
FIG. 8.
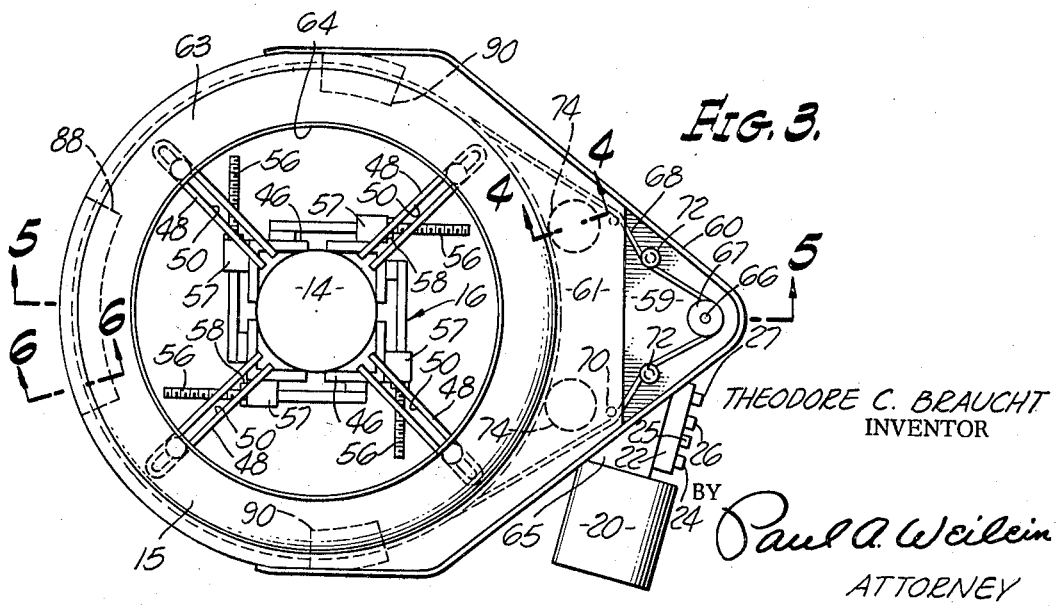
FIG. 3.
THEODORE C. BRAUCHT
INVENTOR
BY Paul A. Weilein
ATTORNEY Dec. 9, 1969   T. C. BRAUCHT   3,483,353
WELDING APPARATUS
Filed Nov. 2, 1967   2 Sheets-Sheet 2

THEODORE C. BRAUCHT
INVENTOR

BY
Paul A. Weilein
ATTORNEY

United States Patent Office 3,483,353
Patented Dec. 9, 1969

3,483,353
WELDING APPARATUS
Theodore C. Braucht, Fountain Valley, Calif., assignor to D & W Rankin Manufacturing Company, Alhambra, Calif., a corporation of California
Filed Nov. 2, 1967, Ser. No. 680,215
Int. Cl. B23k 9/12, 9/02, 9/04
U.S. Cl. 219—125        15 Claims

ABSTRACT OF THE DISCLOSURE

An apparatus for cladding the outer surface of a large workpiece of circular cross section includes a clamp assembly for temporarily mounting a circular member on the workpiece concentrically thereof together with a rotary support structure that encloses the circular member and is rotatably supported thereby. An adjustable arm on the rotary support structure carries an automatic welding device for applying the clad metal to the workpiece and power actuated means on the support structure engages the periphery of the circular member for rotating the support structure and thereby moving the arm and the welding device thereon around the circumferential surface of the workpiece. A bundle of flexible, cable-like connections extend from the welding device to various sources such as an energy source, a welding rod source, a source of cooling fluid, etc. The support structure is repeatedly rotated one full revolution and then reversed, the welding device being shifted by an increment along the arm of the support structure with each reversal of the direction of rotation.

BACKGROUND OF THE INVENTION

My Patent No. 3,254,192, which is hereby incorporated into the present disclosure by reference, teaches a method of depositing clad metal on the interior surface of a large dredge pump shell wherein an exterior frame is mounted over the shell opening and a rotary arm carrying a welding or metal depositing device extends downwardly into the shell. A power driven traction wheel on the arm engages an inner surface of the shell to rotate the arm and means is provided on the arm for manually shifting the welding device incrementally.

The object of the present invention is to provide an apparatus for depositing clad metal on the exterior instead of the interior of a workpiece of circular cross section. One problem is to provide an apparatus that is readily adaptable to workpieces of various sizes and shapes so that only a single investment in equipment suffices for a wide range of workpieces. Another problem is to provide means for moving a metal depositing device around a workpiece circumferentially thereof with means for shifting the metal depositing device by an increment longitudinally of the workpiece after each circumferential traverse.

Another problem is to provide such an apparatus that is capable of making the successive circumferential traverses by the metal depositing device to conform not only to cylindrical exterior surfaces of workpieces, but also to concentric outer surfaces of other configurations, for example, exterior surfaces of conical configuration. Still another problem is to provide such an apparatus for processing exterior surfaces of workpieces of extensive lengths, the requirement be that the apparatus be capable of extension longitudinally of workpieces. A further problem is to provide such an apparatus with simple and convenient controls to facilitate cyclic reversal of the circumferential traverse of the metal depositing device as well as to facilitate incremental shifting of the metal depositing device longitudinally of the workpiece and adjustment in the speed of traverse in accord with changes in diameter of the workpiece.

The object of the present invention is to meet all of these problems in a single apparatus.

SUMMARY OF THE INVENTION

The invention provides an apparatus wherein a circular member of the apparatus is mounted on a workpiece concentrically thereof and a support structure is, in turn, rotatably mounted on the circular member. The rotary support structure has an arm that overhangs the outer surface of the workpiece and carries the device for depositing clad metal on the outer surface of the workpiece. Motor actuated drive means on the support structure engages the circular member to rotate the support structure, with reversal of direction after each full revolution around the workpiece.

To carry out this basic concept, it is necessary to solve the problem of quickly and accurately mounting the circular member on workpieces of a wide range of shapes and sizes. This problem is solved by providing the circular member with a clamp assembly to embrace a cylindrical end portion or extension of a workpiece. In this regard, a feature of the invention is the concept of tack welding a temporary cylindrical extension on a workpiece that does not have the required cylindrical end portion.

The problem of providing a clamp assembly that is adjustable to cooperate with cylindrical extensions of various diameters is solved by providing a circumferential series of clamp members that are tightened together by screw means and are provided with rigid radial arms for connection to the circular member that is to be mounted on the workpiece. With the radial arms longitudinally slotted for adjustable connection to the circular member, the clamp assembly may be readily radially expanded or contracted as required.

Another problem involved in carrying out the basic concept is to drive the rotary support structure effectively and a related problem is to assure that the axis of rotation of the support structure will constantly coincide with the axis of the rotary member and thereby coincide with the axis of the workpiece. A feature of the invention is the solving of both of these problems by means of a power actuated drive means such as a belt or sprocket chain in combination with a pair of rotary centering members.

Preferably, a drive belt is used which is operated by a motor on the rotary support structure and which passes around substantially less than 360° of the periphery of the circular member. Thus, the belt sets up a force component along a radius of the circular member that urges the rotary support structure laterally towards the circular member. The two rotary centering members are idlers which are mounted on the rotary support structure on opposite sides of the force component and are in rolling contact with the periphery of the circular member. Thus, the two idlers not only counteract the tension on the drive belt, but also provide two points of rolling contact with the circular member to maintain accurate concentricity of the rotary support structure relative to the circular member.

The required control of the metal depositing device to follow the exterior surfaces of various workpieces is accomplished, first, by making the rotary arm angularly adjustable relative to the rotary support structure on which it is mounted, second, by providing manually operable rack and pinion means for shifting the metal depositing device along the arm, and, third, by providing a driving unit that is adjustable in speed to compensate for changes in the diameter of the workpiece. In the preferred embodiment of the invention, a second manually operable rack and pinion means controls movement of the metal depositing means laterally of the arm towards and away from the outer surface of the workpiece. An adjustable diagonal brace means varies the angle of the rotary arm as desired and, in addition, the rotary arm may be longitudinally extended as required to overhang the whole length of an extensive outer surface of a workpiece.

The features and advantages of the invention may be understood by reference to the following detailed description and the accompanying drawings.

BRIEF DESCRIPTION OF THE DRAWINGS

In the drawings which are to be regarded as merely illustrative:

FIG. 1 is a side elevation of the presently preferred embodiment of the invention mounted on a workpiece with the workpiece shown in phantom;

FIG. 3 is a plan view of the embodiment;

FIG. 8 is a perspective view of a variable speed power unit that may be used.

DESCRIPTION OF THE PREFERRED EMBODIMENT

The drawings show how the invention may be used in conjunction with a workpiece 10 which is of generally conical configuration with a conical outer surface 12 that is to be clad or built up by application of weld metal thereto. If the workpiece 10 does not have a cylindrical end portion or its equivalent, a cylindrical extension is temporarily tack welded to the workpiece in accurate concentricity therewith, the cylindrical extension being removed after the cladding operation is completed. In this instance, the workpiece 10 has a cylindrical axial extension 14 temporarily tack welded to its upper end.

Figure 7:
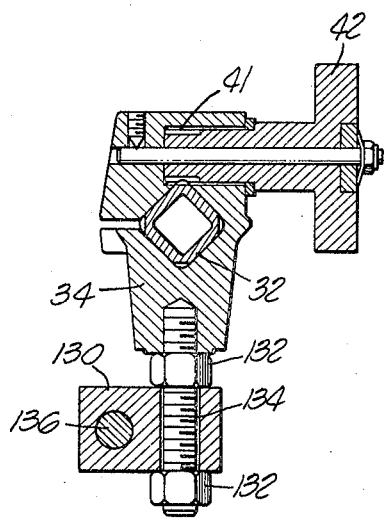
FIG. 7 is an enlarged fragmentary view taken along the line 7—7 of FIG. 1.
Figure 5:
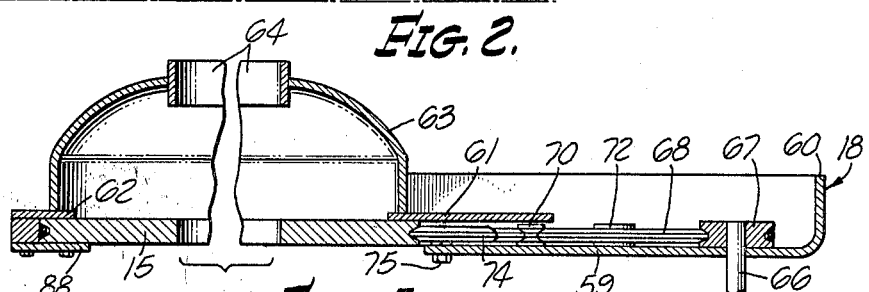
FIG. 5 is a sectional view of the circular member and the surrounding rotary support structure taken along the line 5—5 of FIG. 3.

The principal parts of the invention include: a ring-shaped circular member 15 best shown in FIGS. 3 and 5; a clamp assembly, generally designated 16, for fixedly mounting the circular member 15 on the extension 14 in accurate concentricity therewith; a support structure, generally designated 18, that surrounds the circular member in a rotatable manner for support by the circular member; power actuated means carried by the support structure 18 in operative engagement with the circular member 15 to rotate the support structure 18 about the axis of the workpiece, the power actuated means including a reversible motor 20, a control panel 22 having a push button 24 to start the motor, a push button 25 to stop the motor, a push button 26 to operate the motor in one direction, and a push button 27 to operate the motor in the opposite direction; an arm means 30 that is pivotally mounted on the support structure 18 and extends generally longitudinally of the workpiece, the arm means being adjustable for positioning parallel or nearly parallel with the outer surface 12 of the workpiece; a first rack bar 32 carried by the arm means 30 in spaced parallel relationship thereto; a carriage 34 slidingly mounted on the rack bar for movement longitudinally thereof; a sleeve 35 supported by the carriage and oriented transversely of the first rack bar 32; a second rack bar 36 slidingly mounted in the sleeve 35 for longitudinal movement towards and away from the workpiece; a welding or metal depositing device 38 carried by the second rack bar 36 to apply a bead of weld metal to the conical outer surface 12 of the workpiece; means as generally indicated at 40 for connecting the welding device to required auxiliary supply sources such as an electrical energy source (not shown), a source of welding rod (not shown) and the like; a first pinion means 41 (FIG. 7) in engagement with the first rack bar 32 and manually operable by a knob 42 on the carriage 34 to cause incremental movement of the carriage along the first rack bar; and a second pinion means (not shown) similar to the first pinion means in engagement with the second rack bar 36 and operable manually by a knob 45 to move the second rack bar longitudinally for controlling the spacing of the welding device 38 from the work surface 12.

Within the scope of the invention the mounting means or clamp assembly 16 may take various forms for the purpose of supporting the circular member 15 in a position concentrically of the axis of the workpiece. In the present embodiment of the invention four clamp members 46 in the form of short angle members are positioned longitudinally of the cylindrical extension 14 with the open sides of the angle members towards the periphery of the extension. Each of the angle members 46 has a fixed radial arm 48 with a longitudinal slot 50 therein and a corresponding stud 52 (FIG. 1) on the underside of the circular member 15 extends through the slot to releasably and adjustably connect the slotted arm to the circular member. As shown in FIG. 1, each stud 52 is provided with a spacer collar 54 and a nut 55 which may be tightened to fix the position of the slotted arm relative to the circular member.

This arrangement permits radial adjustments of the radial arms 48 to permit the angle members 46 to embrace extensions 14 of various diameters. Each of the four angle members 46 is further provided with a fixedly mounted laterally extending screw 56 and each of the angle members is further provided with a fixed sleeve 57 to receive the screw 56 of an adjacent angle member. Each of the screws 56 is provided with a nut 58 which may be tightened against the end of the corresponding sleeve 57. As may be understood by reference to FIG. 3, the four nuts 58 may be tightened to tighten the assembly of angle members 46 to cause the angle members to fixedly embrace the extension 14 of the workpiece. In practice, the various nuts 58 are adjusted to result in equal spacing of the angle members, the equal spacing insuring that the angle members are positioned with their slotted arms 48 90° apart. With the four slotted arms at equal angles and with the four studs 52 at equal distances from the corresponding angle members 46, the circular member 15 is concentric to the axis of the extension 14, thus being concentric to the axis of the workpiece 10.

In the present embodiment of the invention, the rotary support structure comprises a lower plate 59 (FIG. 5) formed with an upright peripheral flange 60 and an upper plate 61 that is peripherally welded to the flange. The lower plate 59 extends around about half of the circular member 15 but the upper plate 61 extends all around the circular member and has a large circular opening that is of less diameter than the circular member to form a flange 62 that overhangs the peripheral margin of the circular member. Preferably, a circular shroud 63 is welded to the upper plate to overhang the circular member 15, the shroud including a concentric cylindrical collar 64.

Within the scope of the invention various drive means actuated by the motor 20 may be employed to engage the circular member 15 for rotation of the support structure 18 about the axis of the workpiece 10. Preferably, such a drive means includes a flexible drive member such as a belt in engagement with the periphery of the circular member 15.

In the present embodiment of the invention the motor 20 is provided with a suitable variable speed gear box 65 and actuates a vertical stub shaft 66 (FIGS. 1 and 5) which extends through the support structure 18 and carries a drive sheave 67 on the support structure. A continuous drive belt 68 of V-shaped cross section engages the drive sheave 65 and seats into a V-shaped groove 69 (FIG. 6) that extends around the circumference of the circular member 15. The drive belt 68 engages suitable guide rollers 70 and a pair of rollers 72 that are laterally adjustable for the purpose of tightening the drive belt. The gear box is provided with a speed control lever 73.

Figure 4:
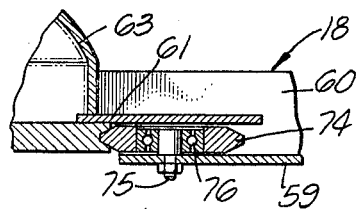
FIG. 4 is an enlarged fragmentary sectional view taken along the line 4—4 of FIG. 3.

It is apparent that in the described arrangement the tension of the drive belt 68 will create a radial force that tends to pull the drive sheave 67 laterally towards the axis of the circular member 15, the radial force thus tending to shift the support structure 18 leftward as the support structure is viewed in FIG. 1. To counteract this force and to maintain the support structure 18 concentrically of the circular member 15 as the support structure is rotated, the support structure journals a pair of rotary members or idlers 74 on opposite sides of the radial force that are tapered to mate with the tapered peripheral groove 69 of the rotary member. As shown in FIG. 4, each of the idlers 74 is mounted on a corresponding stud 75 by means of a roller bearing 76.

Any suitable means may be provided to keep the support structure 18 in the plane of the circular member 15, i.e., to prevent axial displacement of the support structure relative to the circular member. In the present embodiment of the invention this function is performed in part by the engagement of the idlers 74 with the peripheral groove 69 of the circular member and the function is performed in further part by providing the rotary structure with upper and lower flanges that straddle peripheral portions of the circular member. An upper flange for this purpose is the previously mentioned flange 62 formed by the upper plate 61 of the support structure.

Figure 6:
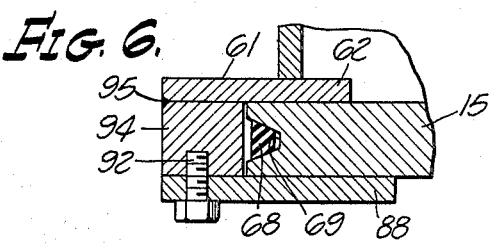
FIG. 6 is an enlarged fragmentary view taken along the line 6—6 of FIG. 3.

To cooperate with the upper flange 61 three lower flanges of relatively short circumferential extent are provided, one lower flange 88 (FIGS. 3, 5, and 6) being diametrically opposite from the drive sheave 76 and two lower flanges 90 (FIG. 3) being spaced approximately 90° from the center of the flange 88. As best shown in FIG. 6, the lower flanges 88, 90 may be in the form of plates attached by screws 92 to an arcuate spacer 94 which is adjacent to the periphery of the circular member 15 and which is fixedly attached to the upper plate 61 by welding 95. It is apparent that in the described arrangement the idlers 74 cooperate with the upper flange 61 and the lower flanges 88 and 90 to prevent axial movement of the support structure 18 relative to the circular member 15.

The arm means 30 may be mounted on the underside of the support structure 18 in any suitable manner and any suitable means may be provided for angular adjustment of the arm means. In the present embodiment of the invention the arm means 30 is of rectangular cross section and is mounted by a pivot 100 on a bracket 102 that extends downwardly from the underside of the support structure 18. Angular adjustment of the arm means 30 relative to the support structure is accomplished by suitable brace means.

Figure 2:
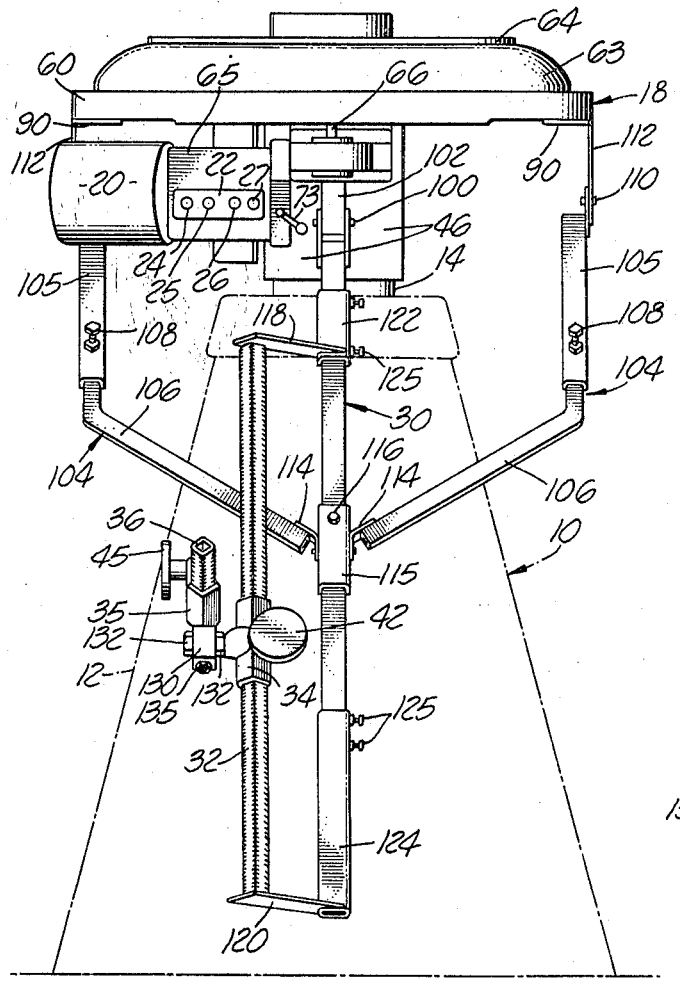
FIG. 2 is a similar side elevation taken at 90° from the side elevation shown in FIG. 1.

In the present embodiment of the invention the brace means comprises two brace arms 104 on opposite sides of the arm means 30, as best shown in FIG. 2. It is contemplated that each of the brace arms 104 will be adjustable in length for varying the angular position of the arm means 30 and for this purpose each brace arm 104 comprises an upper tubular section 105 and a lower angular bar 106, the upper end of the bar being telescoped into the tubular section and being releasably secured therein by a suitable screw 108. Each of the two tubular sections 105 is connected by a pivot 110 to a downwardly extending ear 112 on the corresponding side of the rotary support structure 18. The two angular bars 106 converge towards the arm means 30 and are connected by corresponding clips 114 to a sleeve 115 that is slidingly mounted on the arm means 30 and is releasably anchored by a screw 116. It is apparent that the two screws 108 may be temporarily loosened for expansion or contraction of the two brace arms 104 and it is further apparent that the screw 116 may be temporarily loosened to permit adjustment of the sleeve 115 longitudinally of the arm means 30.

The first rack bar 32 may be mounted on the arm means 30 in any suitable manner. In the construction shown the two ends of the first rack bar 32 are supported by corresponding arms 118 and 120, the arm 118 fixedly extending from a sleeve 122 and the arm 120 fixedly extending from a second sleeve 124. Each of the two sleeves 122 and 124 slidingly embraces the arm means 30 and are releasably anchored by suitable screws 125.

The sleeve 35 in which the second rack bar 36 is slidingly retained may be adjustably mounted on the carriage 34 in any suitable manner. In the construction shown in FIGS. 1, 2, and 7, a metal block 130 is secured by two nuts 132 on a stud 134 that extends from the carriage 34 and the metal block, in turn, is secured by two nuts 135 on a second threaded stud 136 that extends from the sleeve 35.

The welding or metal depositing device 38 may be a commercially available device such as an A–10 torch manufactured by the National Cylinder Gas Company capable of feeding and depositing 300 inches per minute of welding wire. The preferred range is between 100 and 300 inches per minute for a welding wire in the form of a mild steel tube of an outside diameter of 0.109 inch filled with a suitable alloy. In a typical practice of the invention, the welding wire is fed at a rate of approximately 285 inches per minute and the torch travels approximately 78 inches per minute to deposit a continuous bead of metal approximately 3/16 inch thick and 3/8 inch wide.

When the welding torch 38 completes a 360° traverse of the outer surface 12 of the workpiece 10, the operator presses the stop button 25 and manipulates the knob 42 to shift the torch longitudinally of the workpiece by approximately the width of the deposited bead and then depresses the appropriate push button 26 or 27 to reverse the direction of travel of the torch. Since the diameter of the workpiece that is traversed by the torch changes with each circumferential traverse by the torch, the operator manipulates the speed control lever 73 as often as necessary to maintain a substantially constant rate of travel of the torch relative to the surface of the workpiece. The arm means 30 of the apparatus is not necessarily positioned parallel with the surface of the workpiece and usually is not quite parallel. Accordingly, it may be necessary to adjust the second knob 45 slightly to keep the torch at the desired spacing relative to the surface of the workpiece. With the bundle 40 of flexible connections depending from an overhead support, the bundle is twisted alternately 360° in opposite directions but the flexible connections are capable of withstanding such twisting action indefinitely.

FIG. 8 shows a variable speed power actuation means that may be employed with advantage in substitution for the reversible motor 20 and the control panel 22. In FIG. 8 a motor 140 has associated therewith a variable speed transmission generally designated 142, the output speed of which may be varied by manipulating a lever 144. A second lever 145 on the near side of the transmission 142 has three positions, namely, an upper position shown in the drawing for output rotation in one direction, a neutral horizontal position to stop the apparatus, and a third downwardly inclined position to reverse the direction of output rotation. At the end of a traverse in either direction, the lever 145 is manipulated to reverse the direction of the traverse of the torch and the operator manipulates the lever 144 as often as necessary to compensate for changes in the diameter of the portion of the workpiece that is circumferentially traversed by the torch. Thus, if the diameter that is traversed progressively increases, the speed output of the transmission 142 is progressively reduced to maintain a substantially constant rate of travel of the torch relative to the surface of the workpiece.

The variable speed power means shown in FIG. 8 comprises a Zero-Max JK3M3 reversible motor combined with a W2 Zero-Max right angle gearhead, both of which are sold by Andrews Hardware and Metal Company, Los Angeles, California.

It is to be understood that although arc welding is employed in the preferred practice of the invention, other methods of depositing weld material may be used.

My description in specific detail of the presently preferred embodiment of the invention will suggest various changes, substitutions, and other departures from my disclosure within the spirit and scope of the appended claims.

I claim:

1. In an apparatus for depositing a continuous bead of weld metal on an outer surface of a workpiece, the combination of:
   a circular member;
   means to mount the circular member on the workpiece concentrically thereof;
   a support structure surrounding the circular member and rotatably engaging the circular member for support thereby and for rotation about the axis thereof;
   arm means mounted on said support structure and extending therefrom in a direction generally longitudinally of said axis, said arm means being angularly adjustable relative to the support structure for positioning substantially parallel with said outer surface of the workpiece;
   an automatic welding device mounted on said arm means to apply weld metal to said outer surface of the workpiece;
   means connecting said welding device to a plurality of auxiliary supply sources including a source of electrical energy and a source of weld metal,
   said connecting means being flexible and of ample length to avoid interference with movement of the welding device by the arm means;
   manually operable means supported by the arm means to shift said welding device incrementally along the length of the arm means; and
   power actuated means carried by the support member in engagement with said circular member to rotate the support structure about said axis thereby to move said welding device along said outer surface of the workpiece in a direction circumferentially of the workpiece.

2. A combination as set forth in claim 1 which includes a second manually operable means supported by the arm means to vary the distance of the welding device from the arm means laterally thereof thereby to vary the distance of the welding device from said outer surface of the workpiece.

3. A combination as set forth in claim 1 in which said power actuated means includes flexible drive means passing around said circular member and further includes means to actuate the flexible drive means.

4. A combination as set forth in claim 3 in which said flexible drive means acts in tension and passes around substantially less than 360° of the circular member thereby creating a force component between the circular member and the support structure urging the support structure towards the circular member along a radius from said axis;
   and which includes two rotary members journalled on the support structure in rolling contact with the periphery of the circular member on opposite sides of said radius to oppose said component and to maintain the rotation of the support structure concentrically of said axis.

5. A combination as set forth in claim 4 in which the periphery of the circular member is formed with a circumferential groove to seat the flexible drive means;
   in which said two rotary members extend into said groove;
   and in which said support structure is provided with flanges straddling the periphery of the circular member in regions spaced circumferentially from the two rotary members,
   said rotary members and said flanges cooperating with the circular member to prevent axial displacement of the support structure relative to the circular member.

6. A combination as set forth in claim 1 in which the workpiece has an axial extension and in which said means to mount the circular member on the workpiece includes means to fixedly embrace said extension.

7. A combination as set forth in claim 6 in which said means to mount the circular member includes:
   a plurality of clamp members spaced circumferentially around said extension,
   said clamp members being connected to the circular member; and
   screw means adjustably interconnecting the clamp members, whereby the screw means may be manipulated to space the clamp members equally around the extension thereby to position the circular member concentrically of the extension.

8. A combination as set forth in claim 7 in which said clamp members have rigid radial arms with longitudinal slots therein;
   and in which the circular member is connected to the arms by releasable fastening elements extending through the slots to permit radial adjustment of the clamp members relative to the circular member to conform to the various diameters of axial extensions of different workpieces.

9. A combination as set forth in claim 1 in which said support structure has upper and lower inwardly extending flanges overlapping peripheral portions of the circular member to prevent axial displacement of the support structure relative to the circular member.

10. A combination as set forth in claim 1 in which said power actuated means is a motor means that is reversible to reverse the direction of rotation of the support structure and which includes manually operable switch means carried by the support structure to control the power actuated means.

11. A combination as set forth in claim 1 which includes means to vary the rate of rotation of the support structure by the power actuated means to compensate for changes in diameter of the portion of the workpiece that is traversed by the welding device.

12. In an apparatus for depositing a continuous bead of weld metal on an outer surface of a workpiece, the combination of:
   a circular member;
   means to mount the circular member on the workpiece concentrically thereof;
   a support structure surrounding the circular member and rotatably engaging the circular member for support thereby and for rotation about the axis thereof;
   an arm means mounted on the support structure and extending therefrom in a direction generally longitudinally of said axis, said arm means being pivotally connected to the support structure for angular adjustment relative thereto;
   brace means extending from the support structure to an intermediate portion of said arm means at an acute angle relative to the arm means, said brace means being pivotally connected to the support structure and to the arm means and being adjustable in length to vary the angle of the arm means relative to the support structure;
   a first rack bar incorporated in said arm means longitudinally thereof;
   a carriage slidingly mounted on said rack bar, said carriage having a sleeve positioned transversely of the rack bar;

a second rack bar slidingly mounted in said sleeve for longitudinal movement toward and away from said outer surface of the workpiece;

a welding device mounted on said second rack bar to deposit weld metal on said outer surface;

means connecting said welding device to various sources including an energy source and a source of weld metal, said connecting means being flexible to avoid interference with movement of the welding device relative to the workpiece;

a first manually rotatable pinion means mounted on said carriage in engagement with the first rack bar for incremental movement of the carriage along the first rack bar for movement of the welding device longitudinally of the workpiece;

and a second manually operable pinion means on said carriage in engagement with the second rack bar for incremental longitudinal movement of the second rack bar to vary the spacing of the welding device from said outside surface.

13. A combination as set forth in claim 12 in which the opposite ends of said first rack bar are supported by two corresponding support means that releasably engage the main arm and are adjustable along the length of the main arm.

14. A method of cladding the outer surface of an upright workpiece of circular cross section, including the steps of:

temporarily mounting a cylindrical member rigidly and concentrically on the upper end of the workpiece as an axial extension thereof;

rigidly mounting a circular member concentrically on the temporary axial extension;

rotatably mounting a support structure on the circular member for rotation of the support structure concentrically thereof with an arm of the support structure overhanging the outer surface of the workpiece;

mounting a metal depositing device on the overhanging arm and adjusting the device in close spacing with said outer surface;

connecting the metal depositing device by flexible connections to various sources including an energy source and a welding wire source;

creating a driving force between the support structure and the periphery of the circular member to rotate the support structure and thereby cause the metal depositing device to traverse said outer surface of the workpiece circumferentially;

periodically reversing the direction of rotation of the support structure to prevent interference with such rotation by said flexible connections;

advancing the metal depositing device longitudinally of the workpiece at each reverse in the direction of rotation of the support structure; and removing said axial extension after the cladding of the outer surface of the workpiece.

15. A method as set forth in claim 14 in which the direction of rotation of the rotary support structure is reversed at the end of each complete circumferential traverse of the surface of the workpiece by the metal depositing device.

References Cited
UNITED STATES PATENTS

| | | | |
|---|---|---|---|
| 1,281,407 | 10/1918 | Marquess | 25—1 |
| 2,868,165 | 1/1959 | Altman | 118—620 |
| 3,119,009 | 1/1964 | Zeller | 219—125 |
| 3,254,192 | 5/1966 | Braucht | 219—76 |
| 3,262,419 | 7/1966 | Knight | 118—7 |

JOSEPH V. TRUHE, Primary Examiner

L. A. SCHUTZMAN, Assistant Examiner

U.S. Cl. X.R.

118—323; 219—60, 76